(12) United States Patent
Park et al.

(10) Patent No.: US 11,923,610 B2
(45) Date of Patent: Mar. 5, 2024

(54) ANTENNA ARRAY

(71) Applicants: Samsung Electronics Co., Ltd., Suwon-si (KR); HONGIK UNIVERSITY INDUSTRY-ACADEMIA COOPERATION FOUNDATION, Seoul (KR)

(72) Inventors: Jae-Hyun Park, Suwon-si (KR); Jeong-Hae Lee, Seoul (KR); Min-Seo Park, Changwon-si (KR); Young-Ho Ryu, Yongin-si (KR); Sung-Bum Park, Suwon-si (KR); Kwi-Seob Um, Seoul (KR); Chong-Min Lee, Seoul (KR); Chang-Hyun Lee, Incheon (KR)

(73) Assignees: Samsung Electronics Co., Ltd., Suwon-si (KR); HONGIK UNIVERSITY INDUSTRY-ACADEMIA COOPERATION FOUNDATION, Seoul (KR)

( * ) Notice: Subject to any disclaimer, the term of this patent is extended or adjusted under 35 U.S.C. 154(b) by 1395 days.

(21) Appl. No.: 16/331,858

(22) PCT Filed: May 24, 2017

(86) PCT No.: PCT/KR2017/005417
§ 371 (c)(1),
(2) Date: Sep. 12, 2019

(87) PCT Pub. No.: WO2018/048061
PCT Pub. Date: Mar. 15, 2018

(65) Prior Publication Data
US 2023/0198164 A1 Jun. 22, 2023

(30) Foreign Application Priority Data
Sep. 9, 2016 (KR) .......................... 10-2016-0116207

(51) Int. Cl.
*H01Q 1/52* (2006.01)
*H01Q 1/48* (2006.01)
(Continued)

(52) U.S. Cl.
CPC ............. *H01Q 21/065* (2013.01); *H01Q 1/48* (2013.01); *H01Q 1/523* (2013.01); *H01Q 9/0421* (2013.01)

(58) Field of Classification Search
CPC ....... H01Q 1/38–48; H01Q 1/521–523; H01Q 9/0407–0421; H01Q 21/065
See application file for complete search history.

(56) References Cited

U.S. PATENT DOCUMENTS 7,079,079 B2 * 7/2006 Jo ........................ H01Q 9/0421
343/702
9,196,951 B2 * 11/2015 Baks .................... H01Q 1/2283
(Continued)

FOREIGN PATENT DOCUMENTS

JP 2013-247403 A 12/2013
JP 2016-105583 A 6/2016
(Continued)

OTHER PUBLICATIONS

Korean Decision on Grant dated Mar. 8, 2023, issued in Korean Application No. 10-2016-0116207.

*Primary Examiner* — Hasan Islam
(74) *Attorney, Agent, or Firm* — Jefferson IP Law, LLP

(57) ABSTRACT

In various embodiments, an antenna array may comprise a dielectric; a first patch antenna disposed on a first region of the dielectric; a second patch antenna disposed on a second region of the dielectric; and a ground layer including a first sub-ground layer in contact with a lower portion of the first region of the dielectric, a third sub-ground layer in contact with a lower portion of the second region of the dielectric,
(Continued)

and a second sub-ground layer spaced apart from a lower portion between the first region and the second region of the dielectric.

5 Claims, 8 Drawing Sheets

(51) Int. Cl.
  *H01Q 9/04* (2006.01)
  *H01Q 21/06* (2006.01)

(56) References Cited

U.S. PATENT DOCUMENTS

| | | |
|---|---|---|
| 2005/0225492 A1 | 10/2005 | Metz |
| 2008/0291115 A1* | 11/2008 | Doan .................... H01Q 1/2283 343/893 |
| 2012/0190296 A1 | 7/2012 | Sarabandi et al. |
| 2013/0314284 A1 | 11/2013 | Tazaki et al. |
| 2016/0141748 A1 | 5/2016 | Tagi et al. |

FOREIGN PATENT DOCUMENTS

| | | |
|---|---|---|
| KR | 20-0407013 Y1 | 1/2006 |
| KR | 10-2010-0053115 A | 5/2010 |
| KR | 10-1411442 B1 | 7/2014 |
| WO | 2004/004065 A1 | 1/2004 |

\* cited by examiner

ANTENNA ARRAY

CROSS-REFERENCE TO RELATED APPLICATION(S)

This application is a U.S. National Stage application under 35 U.S.C. § 371 of an International application number PCT/KR2017/005417, filed on May 24, 2017, which is based on and claimed priority of a Korean patent application number 10-2016-0116207, filed on Sep. 9, 2016, in the Korean Intellectual Property Office, the disclosure of which is incorporated by reference herein in its entirety.

TECHNICAL FIELD

The present disclosure generally relates to an antenna array, and more particularly, to an antenna array included in a wireless power transmitter capable of wirelessly transmitting power to an electronic device.

BACKGROUND ART

These days, portable digital communication devices have become a necessity to many people. Consumers want to receive a variety of services with high quality in any place at any time. Besides, with the emergence of the Internet of things (IoT), various sensors, home appliances, and communication devices used in everyday living are interconnected into a network. To actively operate these sensors, a wireless power transmission system is required.

Wireless power is transmitted by magnetic induction, magnetic resonance, or electromagnetic waves. Compared to the other schemes, the electromagnetic wave scheme is feasible for long-distance power transmission for a few meters.

The electromagnetic wave scheme, which is mainly used for long-distance power transmission, may transfer power most efficiently by accurately locating a remote power receiver.

DETAILED DESCRIPTION OF THE INVENTION

Technical Problem

In the electromagnetic wave scheme, power may be transmitted through a plurality of patch antennas by beamforming. Mutual coupling between the patch antennas caused by waves formed between the patch antennas bring about the degradation of overall antenna performance. Traditionally, a method of increasing the distance between patch antennas to isolate the patch antennas from each other was considered. However, a shortcoming with the conventional method is the increase of the total size of a wireless power transmitter including patch antennas.

An antenna array according to various embodiments has a structure of preventing propagation of waves formed between patch antennas, thereby preventing mutual coupling between the patch antennas.

Technical Solution

According to various embodiments, an antenna array may include a dielectric, a first patch antenna disposed on a first area of the dielectric, a second patch antenna disposed on a second area of the dielectric, and a ground layer including a first sub-ground layer contacting a bottom of the first area of the dielectric, a third sub-ground layer contacting a bottom of the second area of the dielectric, and a second sub-ground layer distanced from a bottom between the first area and the second area.

According to various embodiments, an antenna array may include a dielectric, a first patch antenna disposed on a first area of the dielectric a second patch antenna disposed on a second area of the dielectric, and a ground layer disposed under the dielectric, and including a recess under a third area between the first area and the second area of the dielectric.

Advantageous Effects

According to various embodiments, an antenna array having a structure of preventing propagation of waves formed between patch antennas may be provided. With the resulting prevention of mutual coupling between the patch antennas, high overall antenna performance may be maintained.

MODE FOR CARRYING OUT THE INVENTION

Figure 1:
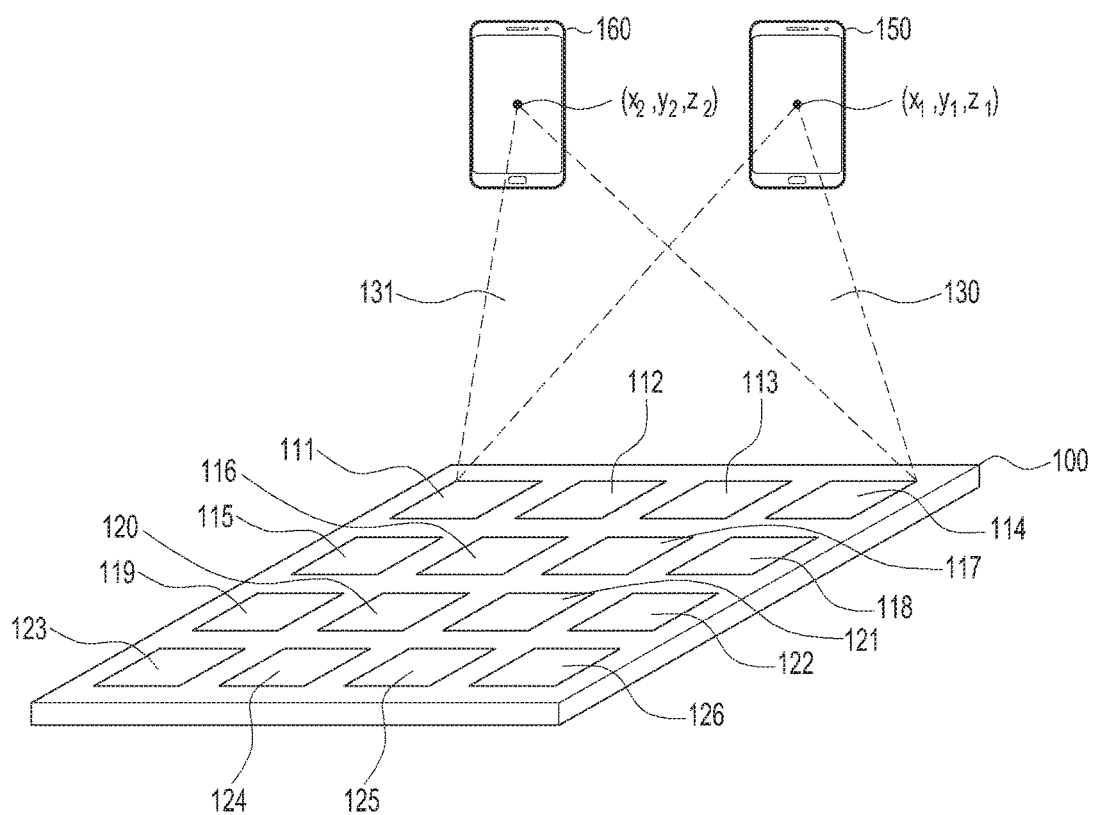
FIG. 1 is a conceptual view illustrating a wireless power transmission system according to various embodiments of the present disclosure.

Reference will be made to various embodiments of the disclosure with reference to the attached drawings. It should be appreciated that the embodiments and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. As used herein, such terms as "1st" and "2nd" or "first" and "second"

may be used to simply distinguish a corresponding component from another, and does not limit the components in importance or order. It is to be understood that if an element (e.g., a first element) is referred to as "(operatively or communicatively) coupled with" or "coupled to" another element (e.g., a second element), it means that the element may be coupled with the other element directly or via a third element.

The term "configured to" as used herein may be interchangeably used with, for example, the term "suitable for", "having the capacity to", "adapted to", "made to", "capable of", or "designed to" in hardware or software under circumstances. Under some circumstances, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations by executing one or more software programs stored in a memory device A wireless power transmitter or an electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device. The wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad), or an implantable circuit. According to some embodiments, a wireless power transmitter or an electronic device may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a media box, a game console, an electronic dictionary, an electronic key, a camcorder, or an electronic picture frame.

According to other embodiments, a wireless power transmitter or an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, a drone, an automatic teller's machine (ATM) in a financial facility, a point of sales (POS) device in a shop, or an Internet of things device (e.g., a lighting bulb, various sensors, a sprinkler, a fire alarm, a thermostat, a street lamp, a toaster, sports goods, a hot water tank, a heater, a boiler, or the like). According to some embodiments, a wireless power transmitter or an electronic device may include at least one of furniture, part of a building/structure or a vehicle, an electronic board, an electronic signature receiving device, a projector, or various measuring devices (e.g., a water, electricity, gas or electromagnetic wave measuring device). According to various embodiments, a wireless power transmitter or an electronic device may be flexible, or may be one or a combination of two or more of the foregoing devices. A wireless power transmitter or an electronic device according to an embodiment of the disclosure is not limited to the foregoing devices. In the disclosure, the term user may refer to a person or device (e.g., artificial intelligence electronic device) that uses a wireless power transmitter or an electronic device.

FIG. 1 is a conceptual view illustrating a wireless power transmission system according to various embodiments of the present disclosure.

A wireless power transmitter 100 may transmit power wirelessly to at least one electronic device 150 and 160. According to various embodiments of the present disclosure, the wireless power transmitter 100 may include a plurality of patch antennas 111 to 126. As far as it generates radio frequency (RF) waves, any antenna is available as each of the patch antennas 111 to 126. At least one of the amplitude or phase of an RF wave generated from the patch antennas 111 to 126 may be adjusted by the wireless power transmitter 100. For the convenience of description, an RF wave generated from each of the patch antennas 111 to 126 is referred to as a sub-RF wave.

According to various embodiments of the disclosure, the wireless power transmitter 100 may adjust at least one of the amplitude or phase of each of sub-RF waves generated from the patch antennas 111 to 126. Meanwhile, the sub-RF waves may interfere with each other. For example, the sub-RF waves may interfere with each other constructively at one point and destructively at another point. According to various embodiments of the present disclosure, the wireless power transmitter 100 may adjust at least one of the amplitude or phase of each of sub-RF waves generated from the patch antennas 111 to 126 so that the sub-RF waves may constructively interfere with each other at a first point (x1, y1, z1).

For example, the wireless power transmitter 100 may detect the positioning of an electronic device 150 at the first point (x1, y1, z1). The position of the electronic device 150 may be a point at which a power reception antenna of the electronic device 150 is located. A configuration for locating the electronic device 150 by the wireless power transmitter 100 will be described later in greater detail. To enable the electronic device 150 to receive power wirelessly with high efficiency, sub-RF waves should be constructively interfered at the first point (x1, y1, z1). Therefore, the wireless power transmitter 100 may control the patch antennas 111 to 126 such that the sub-RF waves may constructively interfere with each other at the first point (x1, y1, z1). Control of the patch antennas 111 to 126 may mean control of the magnitude of a signal input to the patch antennas 111 to 126 or control of the phase (or delay) of a signal input to the patch antennas 111 to 126. More specifically, the wireless power transmitter 100 may control at least one of an amplifier or a phase shifter included in or connected to the patch antennas 111 to 126 to control at least one of the magnitude or phase of a signal input to the patch antennas 111 to 126. Meanwhile, those skilled in the art could easily understand beamforming which is a technology of controlling constructive interference of RF waves at a specific point. Those skilled in the art could also easily understand that the type of beamforming used in the disclosure is not limited. For example, various beamforming methods as disclosed in U.S. Laid-Open Patent No. 2016-0099611, U.S. Laid-Open Patent No. 2016-0099755, and U.S. Laid-Open Patent No. 2016-0100124 are available. The shape of RF waves formed by beamforming may be referred to as pockets of energy.

An RF wave 130 formed by sub-RF waves may have a largest amplitude at the first point (x1, y1, z1), and thus the electronic device 150 may receive wireless power with high efficiency. Meanwhile, the wireless power transmitter 100 may detect the positioning of an electronic device 160 at a second point (x2, y2, z2). To charge the electronic device 160, the wireless power transmitter 100 may control the patch antennas 111 to 126 such that sub-RF waves may constructively interfere with each other at the second point (x2, y2, z2). Therefore, an RF wave 131 formed by the sub-RF waves may have a largest amplitude at the second point (x2, y2, z2), and thus the electronic device 160 may receive wireless power with high efficiency.

More specifically, the electronic device 150 may be located relatively to the right. In this case, the wireless power transmitter 100 may apply a relatively large delay to sub-RF waves generated from relatively right patch antennas (e.g., 114, 118, 122, and 126). That is, sub-RF waves may be generated from the relatively right patch antennas (e.g., 114, 118, 122, and 126) a predetermined time after sub-RF waves are generated from relatively left patch antennas (e.g., 111, 115, 119, and 123). Accordingly, sub-RF waves may meet at a relatively right point at the same time. That is, the sub-RF waves may constructively interfere with each other at the relatively right point. If beamforming is performed at a relatively center point, the wireless power transmitter 100 may apply substantially the same delay to the left patch antennas (e.g., 111, 115, 119, and 123) and the right patch antennas (e.g., 114, 118, 122, and 126). Further, if beamforming is performed at a relatively left point, the wireless power transmitter 100 may apply a larger delay to the left patch antennas (e.g., 111, 115, 119, and 123) than to the right patch antennas (e.g., 114, 118, 122, and 126). Meanwhile, according to another embodiment, the wireless power transmitter 100 may oscillate sub-RF waves at all of the patch antennas 111 to 126 substantially at the same time, and perform beamforming by adjusting a phase corresponding to the delay.

As described above, the wireless power transmitter 100 may determine the positions of the electronic devices 150 and 160, and incur constructive interference between sub-RF waves at the determined positions, thereby performing wireless charging with high transmission efficiency.

Figure 2A:
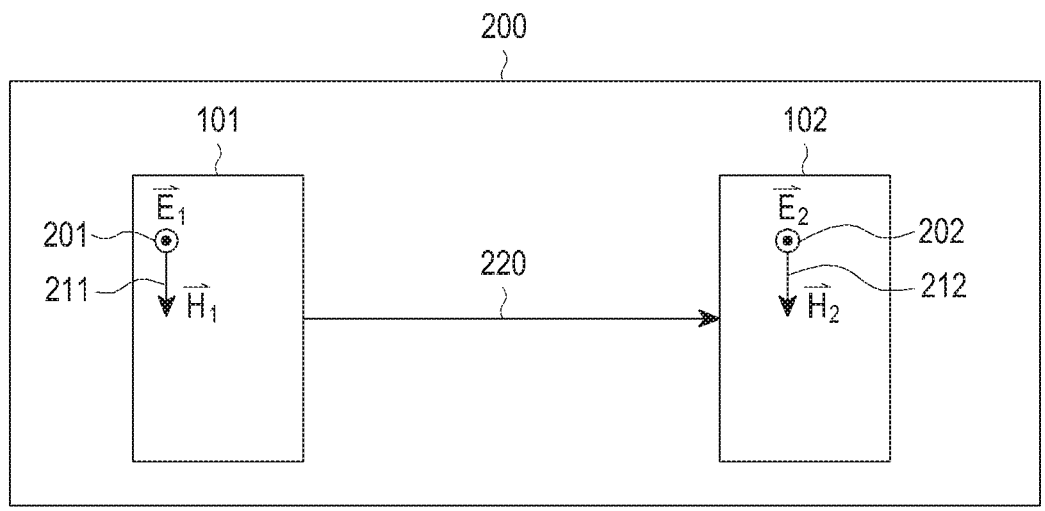
FIG. 2a is a plan view illustrating a part of an antenna array.
Figure 2B:
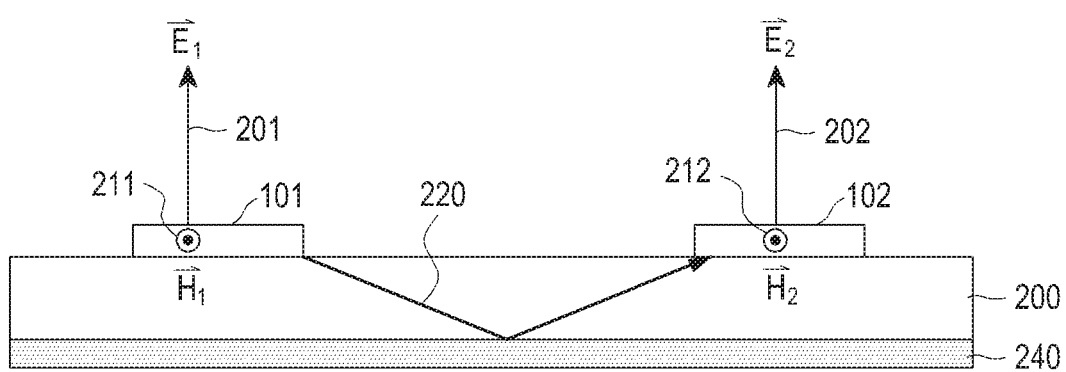
FIG. 2b is a sectional view illustrating a part of an antenna array.

FIG. 2a is a plan view illustrating a part of an antenna array. FIG. 2b is a sectional view illustrating the part of the antenna array.

As illustrated in FIG. 2a, a first patch antenna 101 and a second patch antenna 102 may be arranged distanced from each other by a predetermined gap. The first patch antenna 101 and the second patch antenna 102 may be arranged on a dielectric 200 such as a board. Further, as illustrated in FIG. 2b, a ground layer 240 may be disposed under the dielectric 200. According to various embodiments of the present disclosure, the first patch antenna 101 and the second patch antenna 102 may be connected to the ground layer 240. In this case, the first patch antenna 101 and the second patch antenna 102 may be connected to the ground layer 240 through vias formed on the dielectric 200.

Each of the first patch antenna 101 and the second patch antenna 102 may generate sub-RF waves. For example, the first patch antenna 101 may generate a first electrical field E1 201 formed in an outgoing direction from the first patch antenna 101 and a first magnetic field H1 211 perpendicular to the first electrical field E1 201. Further, the second patch antenna 102 may generate a second electrical field E2 202 formed in an outgoing direction from the second patch antenna 102 and a second magnetic field H2 212 perpendicular to the second electrical field E2 202. In this case, a wave 220 directed from the first patch antenna 101 to the second patch antenna 102 may be formed.

Figure 3:
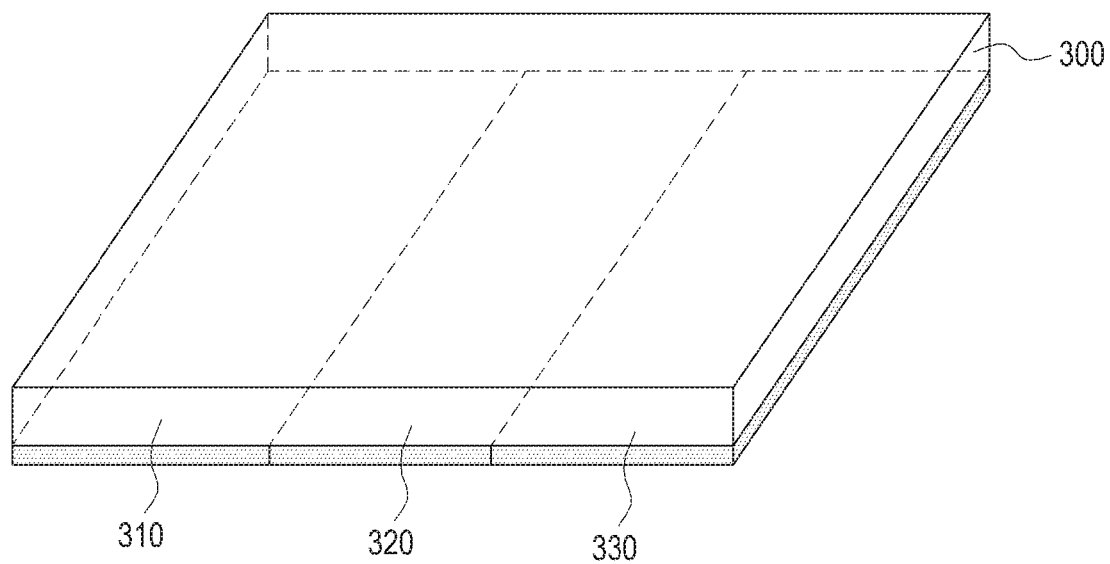
FIG. 3 is a view illustrating a structure including a perfect magnetic conductor (PMC).

Referring to FIG. 2b, the wave 220 may be generated from the first patch antenna 101, guided inside the dielectric 200, and then propagated to the second patch antenna 102. The ground layer 240 may be formed of a conductor such as copper, and thus a conductor 200 may serve as a waveguide. In this case, the wave 220 may be a transverse magnetic (TM) wave. As illustrated in FIGS. 2a and 2b, the magnetic field 211 and the wave 220 may be perpendicular to each other. In general, a perfect electric conductor (PEC) suppresses propagation of a transverse electric (TE) wave, whereas a perfect magnetic conductor (PMC) suppresses propagation of a TM wave. Therefore, as illustrated in FIG. 3, a PMC 320 needs to be disposed between antennas in order to suppress propagation of the TM wave 220. Referring to FIG. 3, conductors 310 and 330, and the PMC 320 may be arranged under a dielectric 300. In this case, since propagation of a TM wave may be prevented by the PMC 320, the effects of one patch antenna on another patch antenna may be prevented. Accordingly, a structure having the same property as that of the PMC 320 needs to be arranged.

Figure 4:
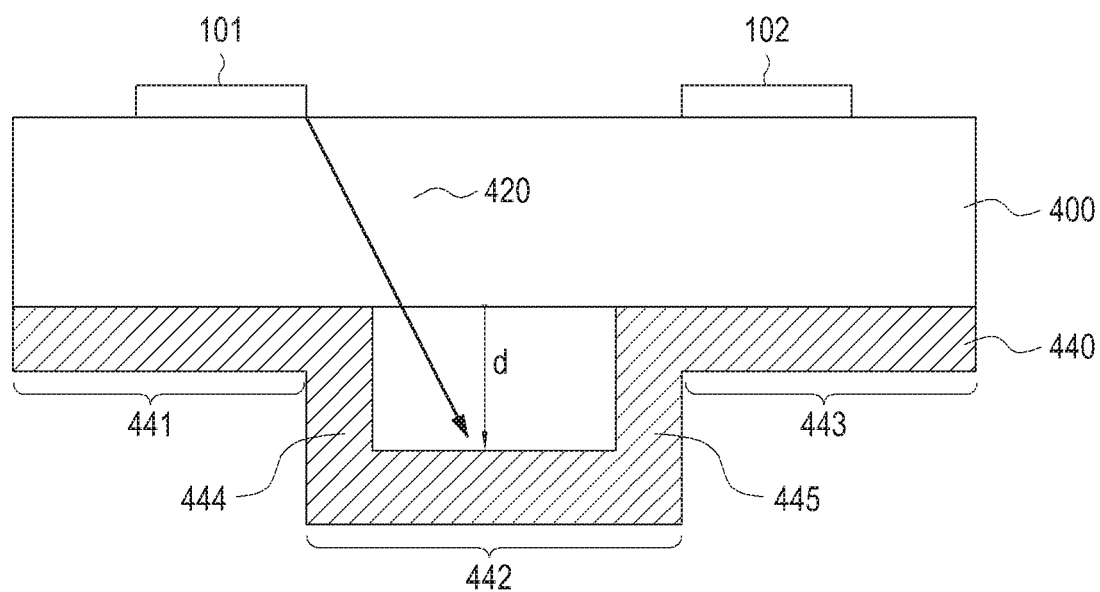
FIG. 4 is a sectional view illustrating an antenna array according to various embodiments of the present disclosure.

FIG. 4 is a sectional view illustrating an antenna array according to various embodiments of the present disclosure.

Referring to FIG. 4, a first electrode 101 and a second electrode 102 may be arranged on a dielectric 400. A ground layer 440 may be disposed under the dielectric 400. The ground layer 440 may include a first sub-ground layer 441, a second sub-ground layer 442, and a third sub-ground layer 443. The first sub-ground layer 441 and the third sub-ground layer 443 may contact the dielectric 400. Meanwhile, the second sub-ground layer 442 may be distanced from the dielectric 400 by d. A first connection portion 444 may connect the first sub-ground layer 441 and the second sub-ground layer 442 to each other, and a second connection portion 445 may connect the second sub-ground layer 442 and the third sub-ground layer 443 to each other. As a result, an empty space may be formed between the second sub-ground layer 442 and the dielectric 400. That is, the ground layer 440 may be configured to include a recess having a depth of d, and the recess may be empty. As a consequence, the second sub-ground layer 442, the first connection portion 444, and the second connection portion 445 may be formed into the shape of a waveguide with one surface open and the other surface closed.

Figure 5:
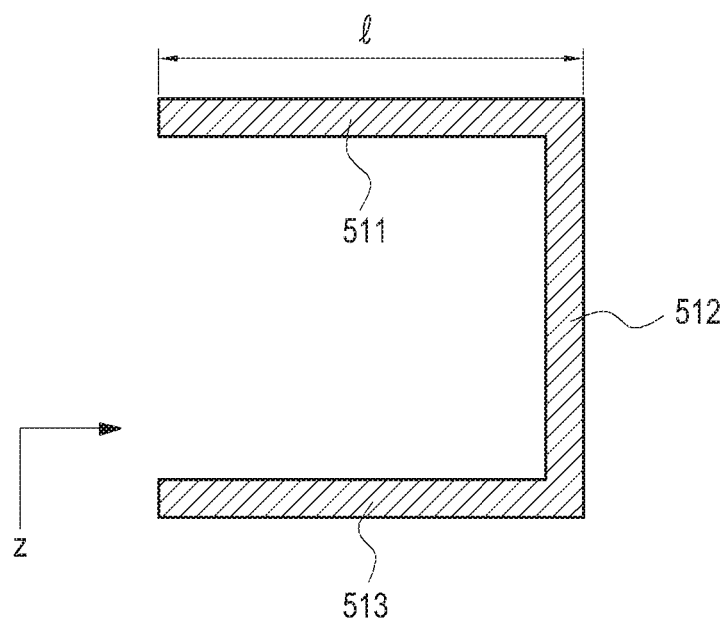
FIG. 5 is a view illustrating the shape of a wave guide according to various embodiments of the present disclosure.

Referring to FIG. 5, two parallel surfaces 511 and 513, and a wall 512 connecting the two surfaces 511 and 513 to each other, which collectively form a waveguide, may be identical in structure to the first connection portion 444, the second connection portion 445, and the second sub-ground layer 442 illustrated in FIG. 4. In this case, the impedance Z of the structure may be determined by [Equation 1].

$$Z = jZ_0 \tan(\beta l)| \qquad \text{Equation 1}$$

In [Equation 1], $Z_0$ may represent any impedance, and $\beta$ may be $2\pi/\lambda$ where $\lambda$ may be the wavelength of a wave, when the wave travels in the recess, that is, the empty space. If l has a value of $\lambda/4$, the inside of the tan function may be $\pi/2$ and the tan function has an infinite value. In conclusion, the impedance may be infinite, which implies that a wave may not be propagated.

With reference back to FIG. 4, the depth d of the connection portions 444 and 445 may be set to a quarter of the wavelength of a wave 420. The depth d may be the distance from the top surface of the sub-ground layer 442 to the bottom surface of the dielectric 400. Therefore, the wave 420 may not travel in the structure of the second sub-ground layer 442 and the connection portions 444 and 445. The resulting prevention of propagation of the wave 420 from the patch antenna 101 to the neighboring patch antenna 102 may improve the isolation between the patch antennas. Since the characteristics of a sub-RF wave generated by the patch antenna 101 may be determined preliminarily, and the wavelength of the wave 420 may also be determined preliminarily, the depth d may be determined.

According to various embodiments of the present disclosure, the length l of the waveguide, that is, the depth d of the waveguide may be determined such that the impedance of [Equation 1] may be equal to or larger than a predetermined impedance. That is, the depth d of the sub-ground layer 442 may be determined to be one of values that lead to the impedance of [Equation 1] equal to or larger than the predetermined threshold, not limited to a quarter of the wavelength of the wave 420. For example, the depth d of the sub-ground layer 442 may be $(2n+1)\lambda/4$ of the wave 420, where n may be an integer equal to or larger than 0.

Figure 6:
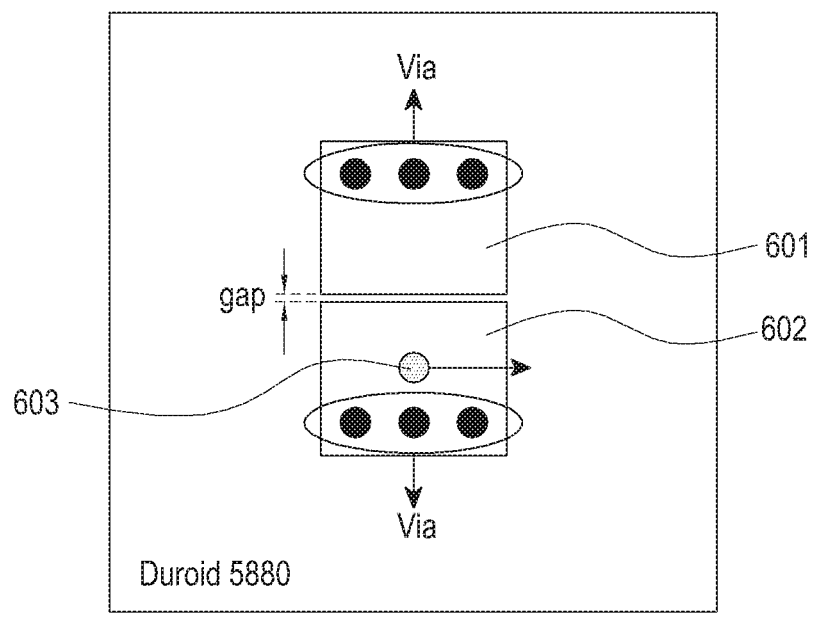
FIG. 6 is a plan view illustrating patch antennas according to various embodiments of the present disclosure.

FIG. 6 is a plan view illustrating patch antennas according to various embodiments of the present disclosure.

Radiators 601 and 602 may be arranged on a Duroid 5880 substrate with a center frequency of 5.8 GHz and a relative dielectric constant of 2.2. The single radiators 601 and 602 may be spaced from each other by a predetermined gap. The gap may function as a capacitor. The single radiators 601 and 602 may be connected to a ground layer (not shown) through vias. Further, the single radiators 601 and 602 may receive power through a coaxial feed 603. The structure in which the single radiators 601 and 602 are connected to the ground layer (not shown) at portions thereof may be referred to as a zero-order resonator structure.

When the single radiators 601 and 602 are connected to the ground layer (not shown) through the vias, parasitic capacitance may be generated within the vias. The magnitude of the parasitic inductance may be changed by the number, height, and thickness of the vias. Meanwhile, since the single radiators 601 and 602 are spaced from each other by the predetermined gap, the gap may be interpreted as a capacitor. The magnitude of the capacitance of the capacitor may be changed by the size of the gap. The wavelength of waves propagated from the single radiators 601 and 602 to another patch antenna may be associated with the magnitude of the afore-described parasitic capacitance and the magnitude of the gap-based capacitance. Accordingly, the wavelength of an intended wave may be determined using the number, height, or thickness of the vias or the size of the gap.

Meanwhile, impedance matching may be achieved by adjusting the distances between the coaxial feed 603 and the vias of the single radiators 601 and 602.

Figure 7:
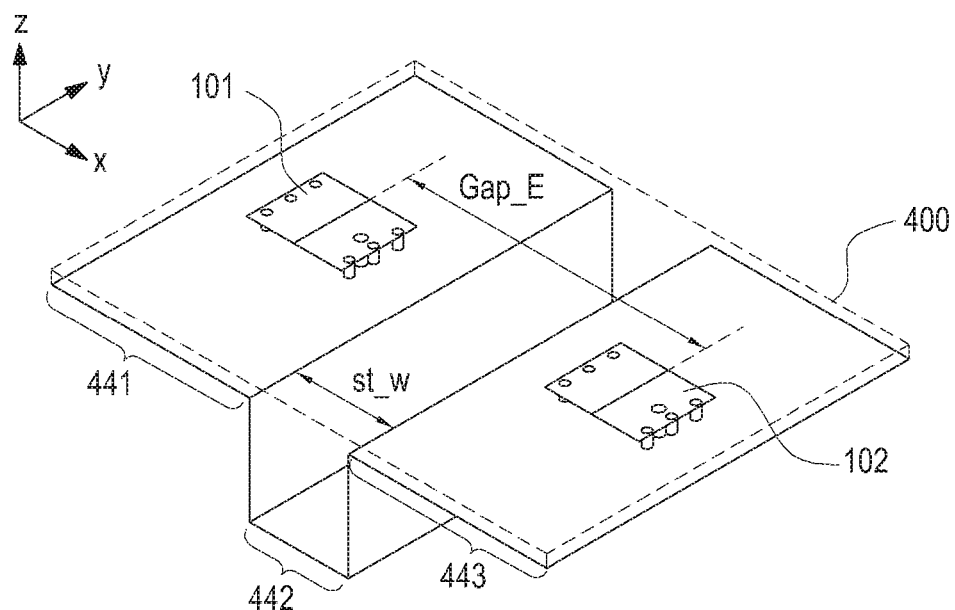
FIGS. 7, 8 and 9 are three-dimensional (3D) aerial views illustrating an antenna array according to various embodiments of the present disclosure.

FIG. 7 is a three-dimensional (3D) aerial view illustrating an antenna array according to various embodiments of the present disclosure.

As illustrated in FIG. 7, the patch antennas 101 and 102 may be distanced from each other by a gap Gap_E. The patch antennas 101 and 102 may be arranged on the dielectric 400. The ground layer including sub-ground layers 441, 442, and 443 may be disposed under the dielectric 400, and the second sub-ground layer 442 may be distanced from the dielectric 400. The second sub-ground layer 442 may have a length st_w.

Figure 8:
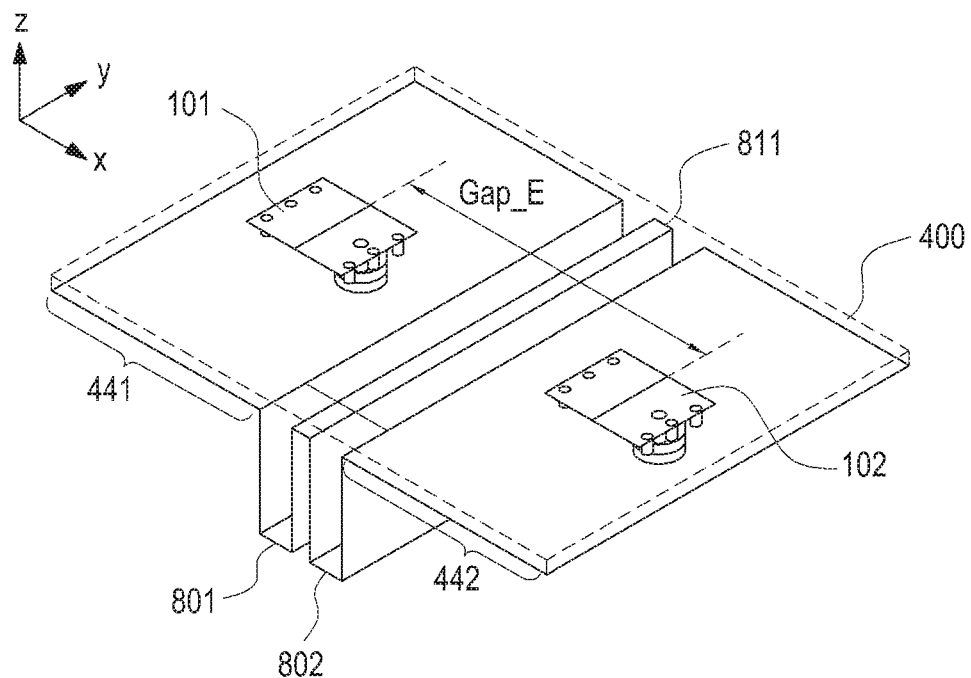

FIG. 8 is a 3D aerial view illustrating an antenna array according to another embodiment of the present disclosure.

Figure 9:
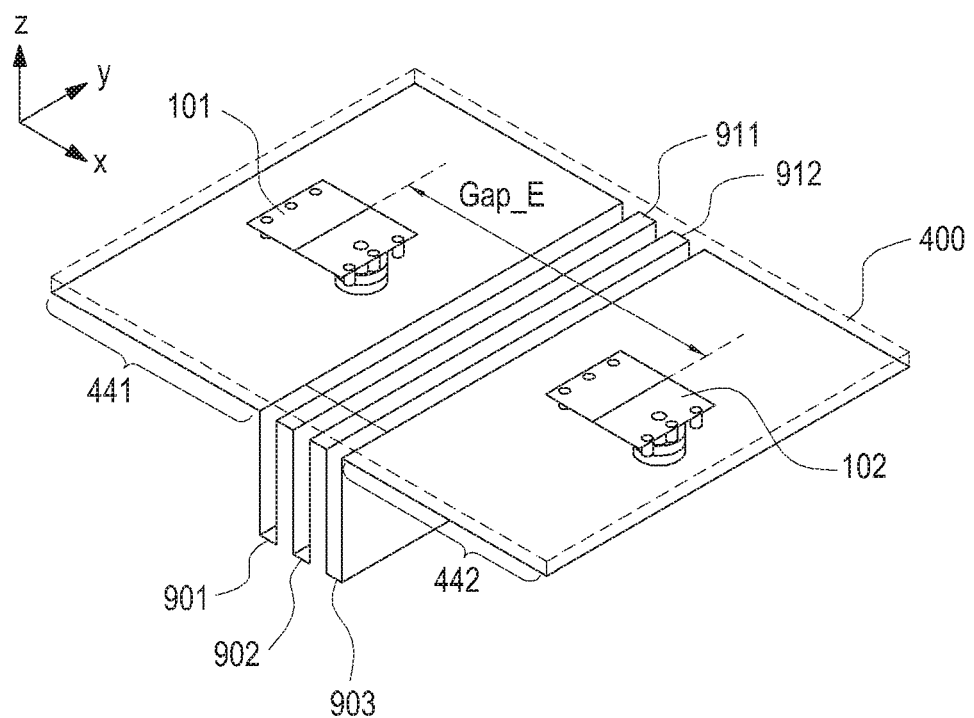

As illustrated in FIG. 8, in the antenna array according to various embodiments of the present disclosure, a ground layer may be distanced from the dielectric 400, at a plurality of portions thereof. For example, as illustrated in FIG. 8, sub-ground layers 801 and 802 may be distanced from the dielectric 400. The depth of the sub-ground layers 801 and 803 may be configured such that an impedance exceeds a predetermined threshold, for example, a quarter of the wavelength of a wave, as described before. Further, as illustrated in FIG. 9, three sub-ground layers 901, 902, and 903 may be distanced from the dielectric 400.

[Table 1] illustrates a performance comparison.

TABLE 1

|  | Example without patch antenna isolation structure | PMC | Example with one structure | Example with two structures | Example with three structures |
| --- | --- | --- | --- | --- | --- |
| $S_{12}$ (dB) | −18.55 | −23.89 | −22.13 | −21.21 | −21.12 |
| Peak gain (dBi) | 8.15 | 9.74 | 10.55 | 10.42 | 10.24 |
| Gain at 180° (dBi) | −3.70 | −8.03 | −11.94 | −10.59 | −10.44 |
| radiation eff. (%) | 96.07 | 97.31 | 97.23 | 97.16 | 97.11 |

As described before, an example with one, two or three structures of isolating a dielectric from a part of a ground layer according to various embodiments of the present disclosure may have a smaller S12 value than an example without any patch antenna isolation structure. That is, it may be noted that the isolation between antennas is high. Further, compared to the example without the patch antenna isolation structure, the example with one, two or three isolation structures may have a high peak gain, and a small gain at 180°. Therefore, a propagation density is increased. Further, compared to the example without the patch antenna isolation structure, the example with one, two or three isolation structures has high radiation efficiency.

Meanwhile, the sub-ground layers may be configured to have different depths. For example, the characteristics of a sub-RF wave generated from the patch antenna 101 may be changed, and a plurality of depths may be configured in correspondence with respective sub-wave characteristics. Therefore, for example, the distance between each of the sub-ground layers 901, 902, and 903 and the dielectric 400 may be different.

Figure 10:
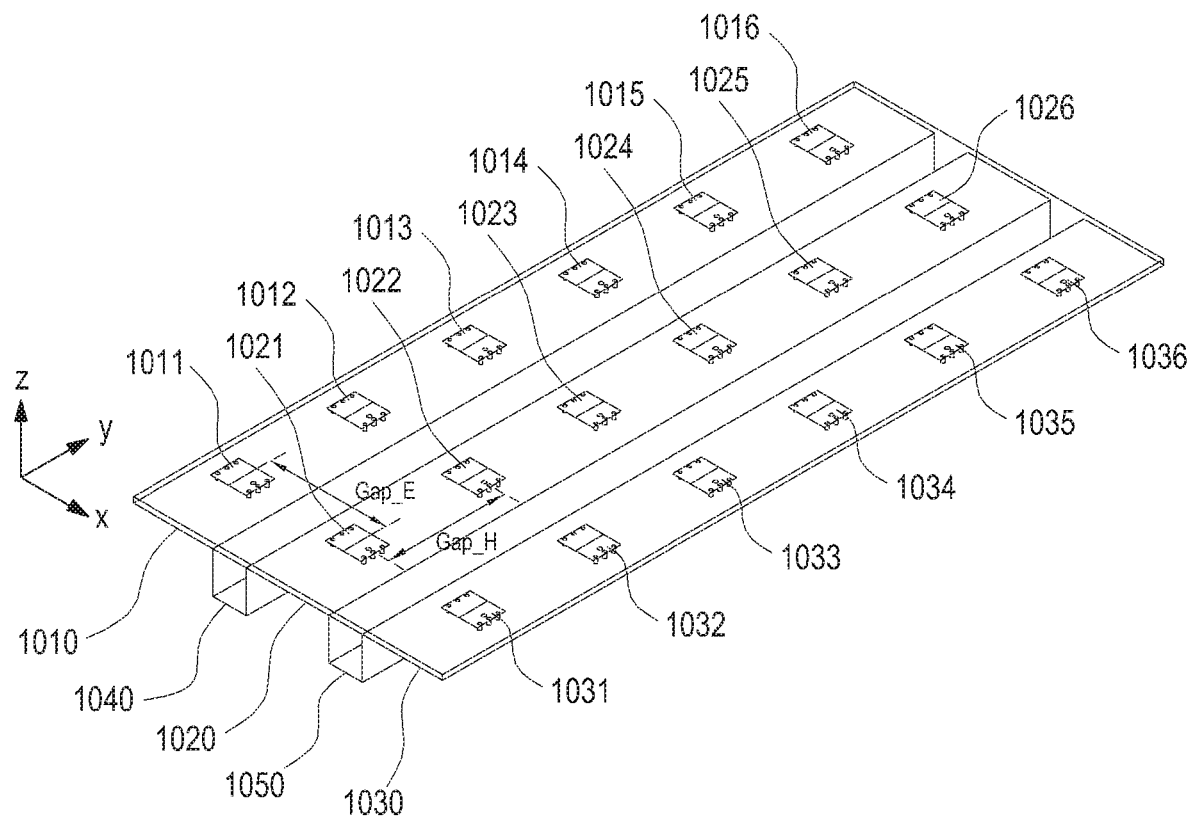
FIG. 10 is a view illustrating a two-dimensional (2D) antenna array according to various embodiments of the present disclosure.

FIG. 10 is a view illustrating a two-dimensional (2D) antenna array according to various embodiments of the present disclosure.

As illustrated in FIG. 10, patch antennas 1011 to 1016 may be arranged on a first area 1010 of a substrate, patch antennas 1021 to 1026 may be arranged on a second area 1020 of the substrate, and patch antennas 1031 to 1036 may be arranged on a third area 1030 of the substrate. The patch antenna 1011 and the patch antenna 1012 may be spaced from each other by a distance Gap_H. The patch antenna 1011 and the patch antenna 1021 may be spaced from each other by a distance Gap_E. A sub-ground layer 1040 may be disposed under between the patch antennas 1011 to 1016 and the patch antennas 1021 to 1026. That is, an empty space between the sub-ground layer 1040 and the dielectric may extend along a direction in which the patch antennas 1011 to 1016 are arranged. Further, a sub-ground layer 1050 may be disposed under between the patch antennas 1021 to 1026 and the patch antennas 1031 to 1036. Based on the above description, waves traveling from the patch antennas 1011 to 1016 arranged on the first area 1010 to the patch antennas 1021 to 1026 arranged on the second area 1020 may be blocked, and waves traveling from the patch antennas 1021 to 1026 arranged on the second area 1020 to the patch antennas 1031 to 1036 arranged on the third area 1030 may be blocked.

Meanwhile, according to various embodiments of the present disclosure, a structure for isolating a dielectric from a ground layer may also be disposed under between the patch antenna 1011 and the patch antenna 1012.

[Table 2] compares the performance of a 2D array antenna with a structure for isolating a ground layer from a dielectric according to the present disclosure with the performance of a general 2D array antenna.

TABLE 2

|  | Example without patch antenna isolation structure | Example with the structure illustrated in FIG. 10 |
|---|---|---|
| $S_{12}$ (dB) | −18.55 | −22.07 |
| peak gain (dB) | 17.87 | 19.45 |
| gain at 180° (dBi) | −0.41 | −4.01 |
| radiation eff. (%) | 95.08 | 97.97 |

As described above, compared to the example without a patch antenna isolation structure, the example with a structure for isolating a dielectric from a part of a ground layer, as illustrated in FIG. 10 may have a small S12 value, that is, high isolation between antennas. Further, the example of FIG. 10 may have a high peak gain, and a small gain at 180°, relative to the example without the patch antenna isolation structure. Therefore, a propagation density is increased. Further, it may be noted that compared to the example without the patch antenna isolation structure, the example of FIG. 10 has high radiation efficiency.

Figure 11:
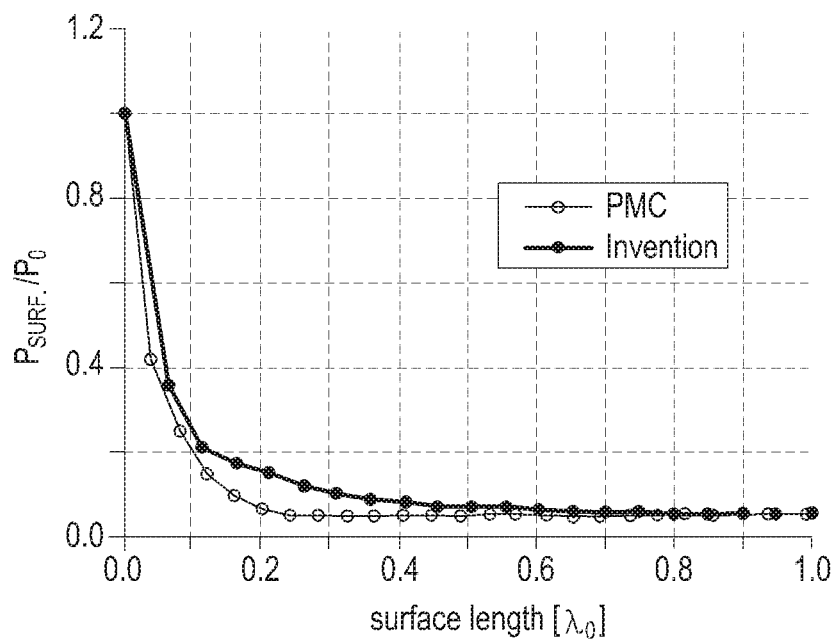
FIG. 11 is a graph comparing the performance of a PMC with performance according to various embodiments of the present disclosure.

FIG. 11 is a graph comparing performance according to various embodiments of the present disclosure with PMC-based performance. Psurf represents propagation in the absence of an isolation structure, and P0 represents propagation in the presence of the structure for isolating a dielectric from a part of a ground layer according to the present disclosure. It may be noted that propagation is rapidly decreased in both the PMC and the present disclosure, that is, wave propagation between patch antennas is blocked.

Figure 12:
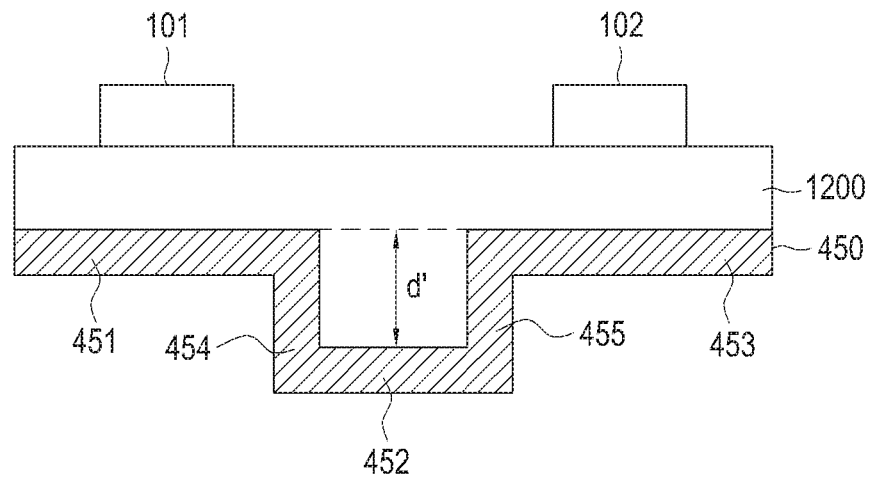
FIG. 12 is a sectional view illustrating an antenna array according to various embodiments of the present disclosure.

FIG. 12 is a sectional view illustrating an antenna array according to various embodiments of the present disclosure.

As descried before, a ground layer 450 may have a recess having a depth d'. The ground layer 450 may include a first sub-ground layer 451, a second sub-ground layer 452, and a third sub-ground layer 453. The first sub-ground layer 451 and the third sub-ground layer 453 may contact a substrate 1200. Meanwhile, the second sub-ground layer 452 may be a surface of the recess having the depth d'. In contrast to FIG. 4, the second sub-ground layer 452 may also contact the dielectric layer 1200. The dielectric 1200 may be positioned inside the recess defined by a first connection portion 454, a second connection portion 455, and the second sub-ground layer 452.

In this case, d' may be, for example, $$\frac{\lambda}{4\sqrt{\varepsilon_{r^2}}}$$

As described before, λ is the wavelength of a wave traveling in the empty space of the recess in FIG. 4. Since the dielectric 1200 resides in the recess, the wavelength of a wave in the dielectric may be $\lambda \varepsilon_{r^2}$. $\varepsilon_{r^2}$ may be the relative dielectric constant of the dielectric 1200. Accordingly, β is $2\pi/(\lambda\varepsilon_{r^2})$ in [Equation 1]. Further, the value of the inside of the tan function in [Equation 1], that is, β×1 may be π/2. Therefore, the tan function may be infinite, and impedance may also be infinite. As a result, waves may not travel in the recess. The depth of the recess may be a $(2n+1)/(4\sqrt{\varepsilon_{r^2}})$ multiple where n may be an integer equal to or larger than 0.

The embodiments described in the disclosure are presented for description and understanding of the technical features, not limiting the scope of the disclosure. Accordingly, the scope of the disclosure should be interpreted as embracing all variations or many other embodiments based on the technical idea of the disclosure.

The invention claimed is:

1. An antenna array comprising:
   a dielectric;
   a first patch antenna disposed on a first area of the dielectric;
   a second patch antenna disposed on a second area of the dielectric; and
   a ground layer disposed on a bottom of the dielectric, wherein the ground layer includes a first sub-ground layer contacting the first area of the dielectric, a third sub-ground layer contacting the second area of the dielectric, and a second sub-ground layer distanced from the bottom of the dielectric and disposed between the first sub-ground layer and the third sub-ground layer, and
   wherein the ground layer includes a first connection portion connecting between the first sub-ground layer and the second sub-ground layer, and a second connection portion connecting between the second sub-ground layer and the third sub-ground layer.

2. The antenna array of claim 1, wherein a distance between the dielectric and the second sub-ground layer is a (2n+1)/4 multiple of a wavelength of a wave propagated from the first patch antenna to the second patch antenna, and n is an integer equal to or larger than 0.

3. The antenna array of claim 1, wherein a distance between the dielectric and the second sub-ground layer is configured such that impedance of a waveguide with one end closed, formed by the first connection portion, the second sub-ground layer, and the second connection portion, is equal to or larger than a predetermined threshold.

4. The antenna array of claim 1, further comprising an additional sub-ground layer distanced from the bottom of the dielectric.

5. The antenna array of claim 4, wherein a distance between the second sub-ground layer and the dielectric is equal to or different from a distance between the additional sub-ground layer and the dielectric.

* * * * *